INVENTORS
EARL C. JOSEPH
ALBERT KAPLAN
BY Marvin Jacobson
ATTORNEY

INVENTORS
EARL C. JOSEPH
ALBERT KAPLAN
BY Marvin Jacobson
ATTORNEY

INVENTORS
EARL C. JOSEPH
ALBERT KAPLAN
BY Marvin Jacobson
ATTORNEY

INVENTORS
EARL C. JOSEPH
ALBERT KAPLAN
BY Marvin Jacobson
ATTORNEY 3,290,647

WITHIN-LIMITS COMPARATOR

Earl C. Joseph, Bloomington, and Albert Kaplan, St. Paul, Minn., assignors to Sperry Rand Corporation, New York, N.Y., a corporation of Delaware Filed May 1, 1962, Ser. No. 191,547
23 Claims. (Cl. 340—146.2)

This invention relates generally to an electronic device for comparing numbers. More particularly, this invention relates to a device for comparing a test number to interval-defining numbers to determine if the test number is within the defined interval. The generic phrase "search memory" has been finding extensive use in the art in referring to devices for comparing a test number to a plurality of stored numbers. A particular embodiment of this invention relates to a within-limits search memory.

In copending application, Ser. No. 19,833 by David E. Keefer, now United States Patent 3,155,945, on Parallel Interrogation of Computer Memories, filed Apr. 4, 1960 (hereinafter referred to as application A) and assigned to the same assignee of the instant application, there is described an equality search memory. In the invention described therein a plurality of binary numbers are stored in respective memory registers. Each bit of the stored numbers is stored in both its complementary ad non-complementary or true binary value in respective ones of a pair of bistable elements. Bits of an external number are compared concurrently to the stored bits in the corresponding bit order position of the respective storage registers. Sensing means for each of the respective storage registers are coupled to all of the bit storage elements in the corresponding register and when all the compared bits in a storage register are of the same binary value as the external member, the sensing means indicates the equality. In the embodiment described in application A, signal representations of the binary value of each bit of the test word are applied to the respectively corresponding stored bits of all of the registers, either to the true storage element or to the complementary storage element, to effect at least a momentary change in the state of the element when the compared bits are not of equal value. Where it is desired to compare only selected bits of the test word to the respectively corresponding stored bits, the signal representations from the unselected bits of the test word are prevented, by gating means, from being applied to the stored bits. In some data processing operations, which will be subsequently described in more detail, it is necessary to compare a test word or an external word to at least one other word, preferably to a plurality of words, to determine if the test word lies within the numeric interval defined by the other word or words.

In the past, the difficulty encountered in performing a comparison of this nature has been to set the other words to a condition such that each one defines a different numeric interval so that an external or test word can then be compared to the interval-defining words and results obtained indicating that the test word lies within any of the defined intervals. Therefore, an object of this invention is to provide means for selectively setting digits of a word to a condition such that the word itself then defines a numeric interval.

It is a further object of this invention to provide means for comparing a test word to at least one interval-defining word and for determining whether said test word lies within the defined interval.

With a plurality of words, each of which defines a different interval, the words can be arranged in a manner such that they will define, in combination, numerical limits. In some data processing applications it is important to determine if the word, a test word, lies within certain numerical limits. Therefore, it is a further object of this invention to combine two interval-defining words, each of which defines a different interval, in a manner to provide numeric limits.

Yet another object of this invention is to provide means for comparing a test word to at least a pair of other words, which in combination define numerical limits, to determine if the test word lies within said limits.

The preferred embodiment of this invention is a search memory which utilizes a plurality of memory storage registers with each bit-storing stage of said registers comprising a pair of bistable magnetic elements. An interval-defining word is stored in each of the registers by selectively setting the elements in some of the stages to opposite magnetic states representing the true and complementary value of the bit stored therein while selectively setting the magnetic elements in other of the stages to a same magnetic state. The magnetic storage elements are preferably of the non-destructive read-out type so that when the external word is compared to the stored words, the internal defined by each of the respective stored words is not modified or altered by the compare operation. In the preferred embodiment, the comparison is performed by placing the test word in an external temporary storage register, each stage of which develops an output signal representation of the binary value stored therein. These signal representations are inductively coupled to the corresponding bit order stages of the memory storage registers so as to effect a momentary change in the magnetic state in one of the opposite state elements in those stages which store bits of unequal value while either not effecting any change in the magnetic state of either element in those stages which have both elements in the same state or effecting a change in state of at least one of said latter elements, irrespective of the value of the corresponding test word bit. Sense lines are inductively coupled to all of the magnetic elements of each storage register to provide a signal indication when the external test word is within the internal defined by the numbers in the respective storage registers. Certain predetermined pairs of these sense lines are logically combined in a manner to provide a signal indication when the test number is within the limits defined by the corresponding pair of stored internal-defining numbers. Although during the comparison the stored information contained in each of the storage registers is not altered, it is sometimes necessary to selectively change the limits defined by the pairs of storage register words. Means are provided for selectively altering the state of the storage elements in certain of said storage register stages. Therefore, it is a further feature of this invention to provide a within-limits search memory wherein the limits are selectively alterable.

Each of the pairs of storage registers which contain the limit-defining numbers can be considered as constituting different address locations in the search memory. When used in connection with an addressable program memory section of a binary computer, a feature of this invention is to associate each of the address locations of the search memory with an address in the program memory so that when the sensing means indicates that the test word is within the limits defined by a pair of registers in the search memory, the program memory address can be enabled as required.

Each of the stored words in the search memory embodiment of this invention can be considered as being made up of separate sections or segments with corresponding bit order stages in all of the registers constituting the same corresponding section or segment. For example, an 18-bit number stored in the storage registers can be considered as being made up of three 6-bit segments with stages 00 through 05 comprising one segment of all registers, stages 06 through 11 comprising a second segment and stages 12 through 17 comprising the third segment. Considering each segment as a separate set of data, each can thereby represent a certain criterion with all three criteria of a segmented word bearing some relationship to each other. This can best be understood by considering the following example. Digitalized data relating to a flying aircraft or missiles are often in the form of information on the range, azimuth and elevation of the aircraft with respect to a fixed point to thereby locate the aircraft. All of the information relative to a given aircraft would be contained in a single binary word but in three segments thereof, each one preferably comprising one-third of the word bit capacity. Each corresponding segment of pairs of storage registers can thereby store the limit-defining numbers for the respective criteria of range, azimuth and elevation and a test word which contains these same respective criteria can be compared segmentally to the stored words to determine if all criteria are within the defined limits. In this manner a further feature of this invention is to provide multi-dimensional within-limits comparisons.

Yet another object of this invention is to provide a comparator which develops a signal to indicate that the dimensions defined by respective segments of a multi-dimensional test number are within the numeric limits defined by other multi-dimensional numbers.

These and other more detailed and specific objects and features will be disclosed and become apparent in the course of the following specification, reference being had to the accompanying drawings in which.

Figure 5:
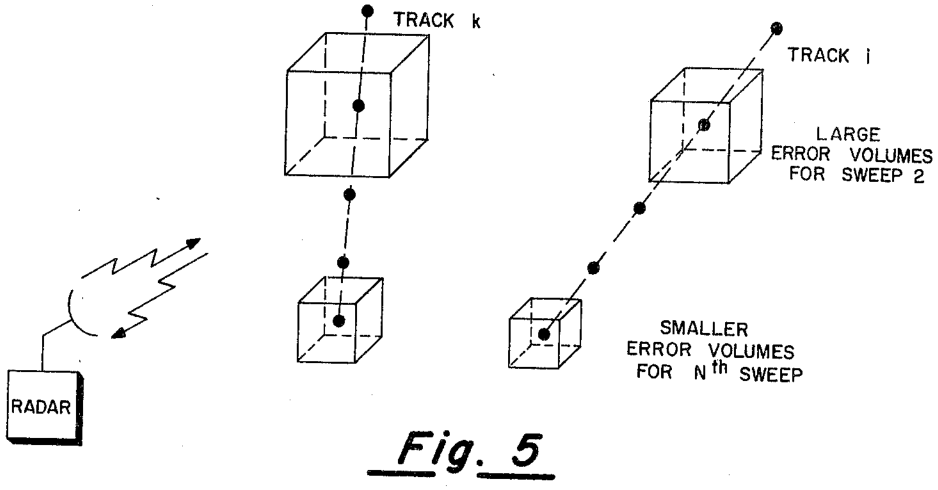
Figure 6:
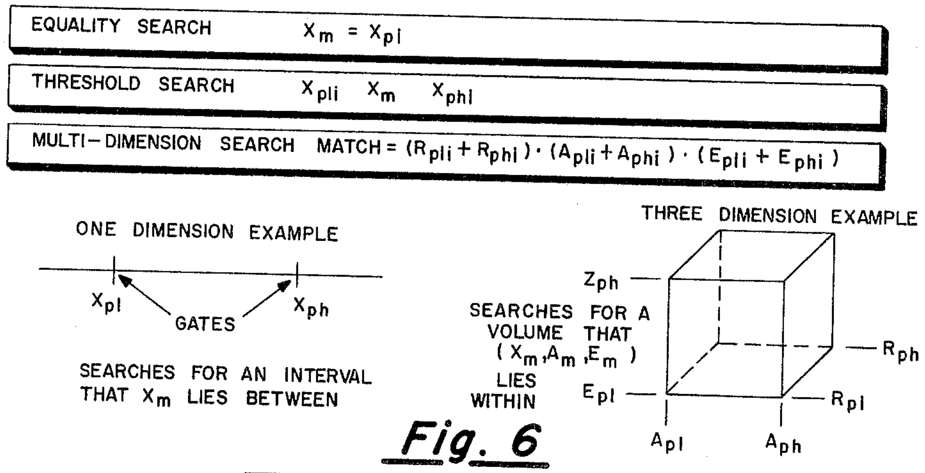
Figure 7:
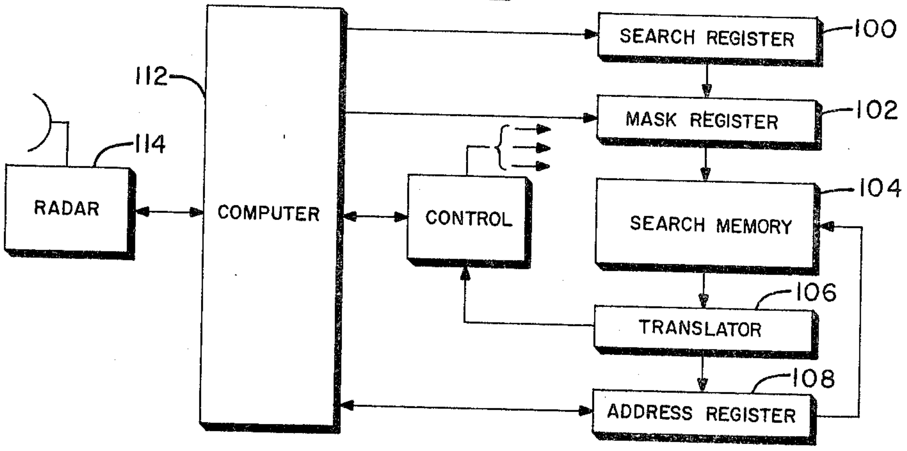

FIGS. 5 and 6 diagrammatically illustrate the function of an embodiment of this invention as applied to within-limits comparison in a single dimension and in three dimensions;

FIG. 7 is a block diagram of an illustrative apparatus for use in a computer-controlled radar track correlation system incorporating the teachings of this invention.

Figure 1:
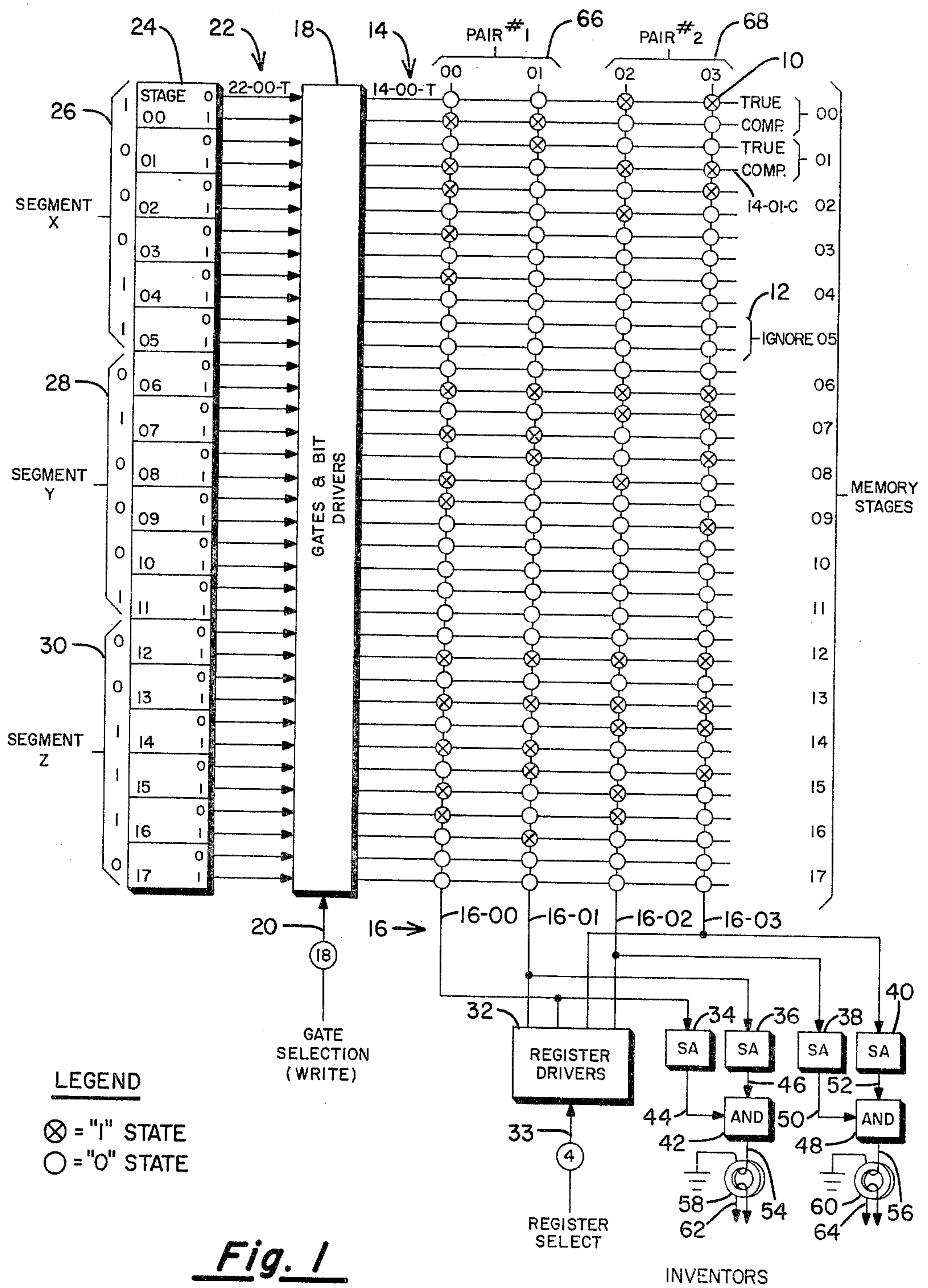
FIG. 1 is a search memory device incorporating some of the features of the instant invention.

In FIG. 1 a plurality of memory elements 10 are arranged in a two dimensional array of rows and columns. Each vertically extending column represents a memory storage register, four of which are shown in FIG. 1 with no limitation thereto intended, and each pair of rows of elements represents a stage of the corresponding register. There are shown thirty-six memory elements in each of the four registers so that each register consists of eighteen stages for storing binary words or numbers of eighteen bit capacity. Each of the memory elements 10 is a magnetic bistable element of the non-destructive read-out type. Preferably each of the memory elements 10 is of a type described in the patent issued to Pohm et al., No. 3,015,807, or of that described in copending application by Pohm et al., Ser. No. 722,584 filed Mar. 19, 1958, now United States Patent No. 3,125,743 (hereinafter referred to as application B), assigned to the same assignee of the instant application. As described in the Pohm patent and application B, the element comprises two magnetic cores which are in magnetic association with each other with one of the cores, referred to as the memory core, providing a biasing field for its associated read core. In storing or writing information into the memory element, the magnetic state of the memory core is set by any well-known writing operation, for example, by using the coincident current technique of applying simultaneous currents to provide at least two magnetic fields simultaneously such as to place the memory core in the desired stable state representative of a binary "1" or a binary "0." For read-out purposes, an interrogating field is applied to the read core. Depending on the state of the memory core, the read core will be biased to a magnetic state so that a signal indication of the binary value stored in the memory core can be sensed in response to the application of the interrogating field to the read core. The interrogating field is applied in a manner such that it will not affect the state of the memory core to any substantial degree and, therefore, the information stored by the memory core will not be altered during the reading operation. This provides the non-destructive read-out feature of the memory element while still allowing selective alteration of the stored information.

In application B the type of signal indication resulting from the applied interrogate field is described. If the information or memory core is in the arbitrarily selected state representative of a binary "1" there will be developed a substantial signal output on a sense line coupled to the read-out core in response to the interrogation. When the memory core is in the "0" binary state, a negligible signal will be developed on the sense line coupled to the read-out core. These will be the signal outputs developed on the sense line when the interrogate field is developed from a current pulse applied to the interrogate or read-out line having a predetermined polarity and magnitude. A second co-pending application by Pohm et al., Ser. No. 855,220, filed Nov. 24, 1959, now United States Patent 3,070,783, and also assigned to the same assignee of the instant application (hereinafter referred to as application C) describes a comparator for comparing two words for equality. Although application C describes an embodiment in which the storage elements are single cores, preferably magnetic thin-films, it is obvious that the two core elements previously described could also be utilized. In the comparator described in application C a first word is stored in a register of bistable magnetic thin-film elements with each element in a state, arbitrarily defined "0" or "1," in accordance with the binary value of the bit it is storing. The bits of another word are compared to the corresponding order bits of the stored word by concurrently applying to each of the storage elements an interrogate signal in accordance with the binary value of the other word. A sensing line is coupled to all of the storage elements to indicate the result of the comparison. When the external bit is a binary "1," the current pulse applied to the interrogate line to develop an interrogate field for the corresponding storage element of the stored word will be of a first polarity whereas if the external word is of "0" binary value the current pulse will be of the opposite polarity. The result achieved in this manner is that if any of the compared bits are of unequal values, the magnetic state of the corresponding bit storage element of the stored word will be momentarily substantially changed so as to induce a signal on the sense line coupled thereto. This in turn indicates inequality between the two compared words. Where there is a plurality of stored words to which an external word is to be compared for equality, this would constitute an equality search memory.

Another search memory is described in application A. In this latter search memory, a plurality of bistable magnetic storage elements are arranged in bit rows and register columns and the bits of each of the stored words are stored in a pair of magnetic elements, one element of a bit-storing pair being in a state representing the true value of the bit and the other of the pair of elements being in a magnetic state representative of the complement of the value of the bit. Selected bits of an external or test word contained in an external register are compared to corresponding order bits of the storage registers and sensing means are coupled to each of the storage registers to indicate the results of the comparison. In the embodiment described in application A, the compare is performed by providing interrogate signals from the external register to the corresponding order bits of the storage registers. The normal output signal fom each stage of the external register provides the interrogating signal which is applied ot the complementary storage element of the corresponding order stages of the storage registers and the complementary output of each of the external register stages provides the interrogate signal which is coupled to the true storage elements of the corresponding order stages of the storage registers. Depending on the binary value of the bit contained in the external register stage, one of the two outputs therefrom is activated to provide a current pulse for interrogation. The orientation of the magnetic storage elements in relation to the interrogate field is such that when the selected bits of the external word are all equal to the corresponding bits in any register, a signal indication of equality will be developed on a sense line coupled to the corresponding register. The actual signal representation of equality may be the absence of a signal on the sense line. For those registers which contain at least one bit not equal in value to the corresponding bit of the external word, a signal indication of inequality will be developed. The array of storage elements of FIG. 1 is essentially identical to that described in application A.

Some of the elements in the array of FIG. 1 are indicated as being in the arbitrarily designated binary "1" state while others are in the binary "0" state. Each of the column registers is respectively labeled at the top thereof as 00, 01, 02 and 03. These latter designations can be considered as the respective address locations of the registers in the storage array. For purposes which will be later described in greater detail, the registers are bracketed and labeled respectively, Pair No. 1 and Pair No. 2.

Considering now the stages of the registers, each pair of rows constitute corresponding bit order stages of the registers. At the right-hand side of FIG. 1 the register stages are bracketed and numbered in accordance with the commonly utilized terminology for binary register stages. The top most pair of rows constitutes register stage 00, the next lower pair of rows, stage 01 etc. through stage 17. Therefore, in the embodiment shown each of the four registers is of eighteen bit capacity. As previously stated, the two elements in a bit-storing stage of the storage registers are in opposite magnetic states representing the true and the complementary value of the bit stored therein. For descriptive purposes, the top row of elements of each stage is designated as storing the true representation of the binary value while the bottom row of each stage is designated as storing the complementary binary value. In further explanation of this it can be seen that stage 00 of register 00 stores a binary "0" since the top core of that stage, which stores the true binary value, is in the "0" state and the complement core of the stage is in the "1" state. Similarly, stage 00 of the register 01 as well as stage 01 of register 00 store binary "0's" since their true storage elements are in the "0" state and their complementary storage elements are in the "1" state. The binary values stored in the remaining bit-storing stages are determined in like manner. Referring now to stage 05 of all of the registers, bracketed at 12 and labeled "ignore," it can be seen that both elements in each of the stages are in the "0" state. These stages can then be considered as not storing binary values since both the true and complementary storage elements are in the same state. This distinguishes the bit-storing stages, in which the two elements are of opposite magnetic states from the non-storing stages. It should be noted that other stages in the registers are also ignore stages, for example stage 17 of all of the registers, and only stage 05 is labeled as such for illustrative purposes.

A plurality of horizontally extending digit drive lines are shown collectively as item 14. Each of the digit drive lines is inductively coupled to all of the elements in the respective rows so that a current pulse applied to any of the digit drive lines will develop a magnetic field for each of the storage elements in the corresponding row. Throughout the remainder of the specification, reference to any one of the digit drive lines will be indicated by a three part designation including the general number, the stage number, and a letter designating whether it is the true or complementary row. For example, the top most digit drive line is designated 14–00–T and the digit drive line fourth from the top is designated 14–01–C. As will be subsequently described in greater detail, the digit drive lines are used both in the compare or search and write or store operations. During the store operation, the digit drive line carries a current pulse to develop a magnetic field in combination with another magnetic field to set the memory core of the element to the desired state. During the compare operation the digit drive line current pulse produces a magnetic field which tends to momentarily affect the magnetic state of the read core of the element.

A plurality of vertically extending write-sense lines, shown collectively as 16, are inductively coupled to all of the elements in the respective registers. The write-sense lines will hereafter be referred to by a two-part number including the general number and the number of the corresponding register. The write-sense line which is coupled to the elements of register 00 will be referred to as 16–00 while the write-sense lines coupled respectively to register 01, 02 and 03 are labeled 16–01, –02 and –03, respectively. The write-sense line serves a dual purpose. During a write or store operation the write-sense line corresponding to the register in which information is to be stored is activated by a pulse of current applied thereto to provide the other magnetic field which, in combination with the magnetic field from the digit drive line, sets the memory core of the element to the desired state. In this manner there is provided the means for selectively altering and selectively setting the stages of the storage registers. During a search or compare operation the effect of the interrogate field applied by the digit drive lines is sensed by the write-sense line and a signal indication of the results of the compare is obtained thereby.

Current pulse signals for the digit drive lines 14 are provided by the Gates and Drivers Section 18. The drivers can be any well-known current generators which are capable of selectively providing current pulses to the respective digit drive lines. As will be subsequently described in relation to FIG. 2, one embodiment includes two drivers for each of the respective digit drive lines, a write driver and a search driver, making a total of seventy-two drivers in the embodiment shown in FIG. 1. As will be subsequently described in greater detail, during the write or store operation, digit write drivers are selectively energized to provide current pulses to the digit drive lines in accordance with the binary value to be stored in the storage registers. During the compare operation the digit search drivers are selectively energized to provide current pulses to the digit drive lines. The gates contained in section 18 are of any well-known type, for example, a diode AND circuit or the like. Preferably there is a gate for each of the digit write drivers which results in thirty-six gates in the embodiment shown. The gates provide the means for selectively energizing the digit write drivers. A first gate enabling signal for each of the gates of section 18 is provided from means not shown via the cable 20 which is symbolically shown to include 36 lines therein. The other gate enabling signal for the respective gates are applied as inputs to section 18 by a plurality of lines labeled collectively 22. Hereinafter in referring individually to each of these latter lines they will be described similarly as the corresponding digit drive line with a three part label. For example, the topmost line is labeled 22–00–T as shown.

The gates are two input circuits, one of the inputs being via the cable 20 and the other input being via one of the lines 22 and will be enabled only when signals occur concurrently at both inputs.

At the left side of FIG. 1 there is shown an eighteen stage external binary register 24 which can be of any type well known in the art. Each of the stages has bistable capabilities for storing bit values therein. Furthermore, each stage includes means for developing signal output representations of the binary value of the bits stored therein. In the embodiment shown in FIG. 1 each stage is capable of outputting a "1" or a "0" signal representation and has an output terminal which will be activated by a signal thereon in accordance with the binary value. These terminals are respectively labeled 0 and 1 to indicate that when the stage stores a binary "1," the terminal labeled 1 will output a signal and when the stage stores a binary "0," the terminal labeled 0 will output a signal. Each of the stage output terminals is connected to a different one of the lines 22 to provide one of the enabling signals for the respective gates in section 18. Each of the lines 22 which is designated as being associated with a row of true storage elements is connected to the "0" output terminal of the corresponding stage of the external register 24 while each of the lines 22 shown to be associated with the respective rows of complementary storage elements is connected to the "1" output terminal of the respectively corresponding stages of the external register. For example, line 22–00–T is connected to the "0" output terminal of stage 00 of the external register 24 while line 22–00–C is connected to the "1" output terminal of the same stage. No limitation to the foregoing is intended since it will become obvious that the drive current polarities can be selected with relation to the magnetic state of the storage elements such that the "1" output terminals can be connected to the true rows while the "0" output terminals can be connected to the complement rows.

During the writing operation the information which is to be stored in the storage registers or which is to be utilized for altering previously stored information is contained in the external register 24 while during the comparing or searching operation the external register contains the test word which is to be compared to the stored numbers. Although the number contained in the external register is generally treated as a single number or word of eighteen bits, it can be considered as being made up of multiple segments. For descriptive purposes, the word in the external register 24 of FIG. 1 is shown as comprising three segments each of which includes one-third of the bit capacity of the register. These segments are symbolically shown by brackets 26, 28 and 30, respectively labeled segment X, segment Y and segment Z. As previously described and as will be subsequently described in relation to a specific embodiment of the instant invention, each of the segments may be thought of as containing numeric representations of different dimensions with all of these dimensions being inter-related.

Each of the write-sense lines 16 is coupled to the Register Driver section 32 and one of the Sense Amplifiers 34, 36, 38 and 40. The Register Driver section 32 may either have a separate current generator for each of the respective write-sense lines, as will be described relative to FIG. 3, or alternatively may include a single current generator and means for selectively applying the output of the current generator to one of the four write-sense lines. The Register Driver can be of any type well known in the art which will develop a current pulse output when energized. During a write operation the write-sense lines associated with the particular register in which information is to be stored or altered receives the current pulse from the Register Driver 32 to provide one of the coincident currents required in order to develop sufficient magnetic field to set the state of the storage elements. During a compare or search operation the Register Driver is inactivated so that signals appearing on the write-sense lines will be those resulting from said compare or search operation and will be applied as inputs to the respective Sense Amplifiers. The Sense Amplifiers are respectively associated with a different storage register with Sense Amplifier 34 associated with register 00, Sense Amplifier 36 with register 01, Sense Amplifier 38 with register 02 and Sense Amplifier 40 with register 03. The Sense Amplifiers also can be any type well known in the art which are capable of outputting a signal in response to a signal appearing on its associated sense line. The output of Sense Amplifiers 34 and 36 provide inputs to the two input AND circuits 42 via lines 44 and 46 and Sense Amplifiers 38 and 40 provide inputs to AND circuits 48 via lines 50 and 52. The AND circuits can also be any type well known in the art and will provide an output signal only when signals occur substantially concurrently on the two inputs. The outputs of the AND circuits 42 and 48 are respectively connected to input windings 54 and 56 of bistable toroidal magnetic cores 58 and 60 which have respective output windings 62 and 64. By means not shown, the toroidal cores 58 and 60, are originally set to a first stable state. The occurrence of a signal on their respective input windings 54 and 56 will cause the associated core to switch to its other state. Subsequent read-out of the toroidal core produces a signal indication of the state of the core on the associated output windings 62 and 64. Since an output signal from the respective AND circuits depends upon the concurrent presence of signal inputs to the associated pair of input Sense Amplifiers it can be seen that only when signals are concurrently induced on both of the associated pair of write-sense lines 16 will the associated toroidal core be switched.

In this manner the signal indicating output windings 62 and 64 are each respectively associated with register pairs 1 and 2.

Each of the storage registers of FIG. 1 is shown to contain previously stored information in the form of a binary number. The number stored therein is an interval defining number as will be now explained. This explanation will be limited to only that portion of the stored number in register 00 corresponding to segment X, as bracketed by 26, and includes only the first six stages of the register. From this explanation it will be obvious how each of the segments define different intervals or how the entire word could be composed to define an interval. Considering segment X as constituting a single word or number with the lowest bit order stage being stage 05 and the highest bit order stage being 00, the number stored in register 00 corresponding to that segment is the binary number 00111*b* wherein *b* denotes a non-binary value or that the stage contains ignore bits. Since the lowest order stage is in the ignore state, the stored binary number can then be said to represent the six bit binary numbers extending from 001110 through 001111. Relating this to decimal notation, the stored number therefore, defines the numeric interval of 14 through 15. As will be subsequently described in greater detail, if an unknown number were compared to the stored number above, an indication would be obtained to indicate that the unknown number lies within the range of the interval as defined by the stored number. Segment X of register 01 containing the binary number 01*bbbb* defines an interval ranging from decimal 16 to 31; segment X of register 02 storing binary number 100*bbb* defines a decimal interval ranging from 32 through 39; and segment X of register 03 containing binary number 101*bbb* defines an interval ranging from decimal 40 through 47. Although the interval defining numbers have been described as relating to numeric quantities, it should be recognized that these can be coded representations of various items, as for example alpha-numeric characters.

The means for setting the stages of the registers to the respective states so that the register contains signal representations of an interval defining word or number will now be described. As previously stated, the storage elements 10 are preferably of the two core non-destructive read-out type as described in the Pohm patent supra or application B. The description will be limited to the storage of information in segment X of the registers and from this description the manner of storing information into the other segments or into the registers as one complete entity will be obvious. Prior to the storing or write operation, all of the elements are first cleared or switched to the reset state, arbitrarily designated binary "0," by means not shown. To store the binary number 00111*b* into the X segment of register 00, a binary number containing binary values 0, 0, 1, 1, 1 in the respective five highest bit order stages and any binary value in the lowest bit order stage is transmitted, by means not shown, to the corresponding stages 00 through 05 of the external register 24. Stages 00 and 01 of the external register develop output signals on their respective "0" output terminals and these signals are transmitted to the respective gates in section 18 via the respective lines 22–00–T and 22–01–T. Assuming that stage 05 is in the "1" state, the external register stages 02, 03, 04 and 05 being in a state representative of a binary "1" will output signals from their respective "1" output terminals which will be transmitted to the gates in section 18 respectively by lines 22–02–C, 22–03–C, 22–04–C and 22–05–C. These signals will provide one input to the respectively associated two input gates in section 18. By means not shown, the five gate enable signals associated with stages 00–04 will be transmitted thereto via cable 20 to provide the second input signal to each of the respective gates. The enabled gates, in turn, activate their respectively associated digit write drivers which, in turn, generate current pulses which are applied to the respectively associated digit drive lines. These latter pulses are of magnitude and polarity to provide a first magnetic field to all of the storage elements inductively coupled to the corresponding digit drive line tending to set those elements to the "1" state. The digit write driver which is coupled to digit drive line 14–00–C is activated by the gate associated with the 0 output of stage 00 and the driver coupled to drive line 14–01–C is activated by the gate associated with the 0 output of stage 01. Those digit write drivers which provide current pulses respectively to drive lines 14–02–T, 14–03–T and 14–04–T are likewise activated by their associated gates. The write drivers associated with stage 05 are not activated since their gates do not receive a gate enable signal. It can be seen, then, that the complement rows of elements for stages 00 and 01 of the storage registers and the true rows of elements of stages 02–04 receive magnetic fields which tend to set them to the "1" state. Neither element of stage 05 of the storage registers has a first magnetic field applied to them. In this manner then, signal representations of the binary values contained in stages 00–04 of the external register 24 are transmitted to the corresponding stages of the storage registers via respective ones of the digit drive lines 14. Since the digit write drivers associated with the external register stage is not activated, no current pulse is applied to bit drive lines 14–05–T and 14–05–C.

Substantially simultaneously with the digit drive line writing pulses, a register select signal, which is developed by means not shown, is applied to the Register Driver section 32 via one of the four inputs in cable 33. This register select signal selectively activates the register driver associated with write-sense line 16–00, which is inductively coupled to all of the storage elements in register 00. The magnetic field developed by a current pulse on line 16–00 in combination with the magnetic fields developed by the current pulse on the bit drive lines 14–00–C, 14–01–C, 14–02–T, 14–03–T and 14–04–T produce at their respective intersections a magnetic field of sufficient magnitude and proper orientation to set the storage element at said intersections to a state representative of a binary "1." Although all of the other storage elements in the register 00 are subjected to a single magnetic field resulting from the current pulse on write-sense line 16–00, this magnetic field alone is insufficient to alter the magnetic state of said other storage elements in that register. In a similar manner it can be seen that although some of the storage elements in registers 01, 02 and 03 likewise are subjected to a magnetic field developed by the current pulse applied to an associated bit drive line, this single magnetic field is also insufficient to alter the state of the storage element. As a result of the foregoing, the complement storage elements of stages 00 and 01 of register 00 are set to a state representative of a binary "1" while the true storage elements remain in the "0" state. The complement elements of stages 02–04 remain in the "0" state while the true elements are set to the "1" state. Stage 05 of register 00 is in the ignore or non-storing state since both the true and complement elements are in a same "0" state. In a similar fashion, information in the form of interval defining words or numbers can be stored in each of the registers by selectively activating the register drivers coupled to lines 16–01, 16–02 and 16–03 while selectively applying binary value signal representations to certain ones of the digit drive lines 14.

Prior to describing a search or compare operation it is beneficial to review briefly the response of the magnetic storage elements 10 to an applied interrogate field. As previously stated, each of the storage elements 10 is preferably a two core element in which the memory core biases the read core. In the preferred embodiment, when the memory core is in the arbitrarily designated "0" state, it biases the read core to a position on its substantially rectangular hysteresis loop such that an interrogate field applied to the read core will drive it further into magnetic saturation and substantially no signal will be induced in the inductively coupled sense line. When the memory core is in the arbitrarily designated "1" state, the read core is biased such that upon application of an interrogate field it will traverse its hysteresis loop and develop a substantial output signal on the inductively coupled sense line. In the latter case when the interrogate field is removed, the effect of the memory core magnetic field is such as to return the read core to its origin on the hysteresis loop so that upon subsequent interrogation the previously stored information can be read out again. Since the interrogate field does not substantially affect the magnetic field of the memory core the two core storage element is characterized by its non-destructive read-out feature. As will be described hereafter in greater detail, during a search or compare operation when an interrogate field resulting from a current pulse on a digit drive line is applied to a storage element in the "0" state, there will result no substantial signal induced on write-sense line inductively coupled thereto but a current pulse applied to a digit drive line which is inductively coupled to a storage element in the "1" state will cause a substantial signal being induced on the inductively coupled write-sense line. The digit drive lines 14 are disposed with relationship to their inductively coupled storage elements, and the polarity of the current pulses applied to the digit drive lines are such as to effect the foregoing while not producing any substantial effect on the memory core of the two-core storage element.

Considering now that segment X, 26, of the external register 24 receives, by means not shown, the binary test number 100011 in the respectively corresponding stages 00–05. This number, equal to decimal 35, is shown in FIG. 1 immediately to the left of those six stages of the external register. Further assume that the corresponding segment of each of the storage registers 00–03 have stored therein the numbers previously described. Segment X of register 00 stores the binary number 00111*b* which defines the decimal interval of 14–15; storage register 01 stores the binary number 01*bbbb* which defines the decimal interval of 16–31; storage register 02 stores the binary number 100*bbb* which defines the decimal interval 32–39; and storage register 03 stores the binary number 101*bbb* defining the decimal interval of 40–47. In general, the contents of the storage registers are unknown but for purposes of explanation and description they are assumed to be known.

Similar as to the previously described writing or storing operation, the output terminal of each of the stages of the external register 24 provides a signal output in accordance with the binary value stored in the respective stages. Stages 00, 04 and 05 each being in the "1" state have outputs on their respective "1" output terminals which are coupled to the corresponding digit search driver in the Gates and Bit Driver section 18 respectively by lines 22–00–C, 22–04–C and 22–05–C. The digit search drivers associated with the "0" output terminals of external register stages 01, 02 and 03 receive signal inputs thereto via their respective lines 22–01–T, 22–02–T and 22–03–T. In response to their activating input signals from the external register 24, the digit search drivers apply current pulses concurrently to all of the respectively associated digit drive lines 14. In this manner current pulses are applied to digit drive lines 14–00–C, 14–01–T, 14–02–T, 14–03–T, 14–04–C, and 14–05–C so that all of the storage elements 10 inductively coupled to said digit drive lines receive an interrogate field. Although the interrogate field is applied to all stages of all of the registers concurrently, for explanatory reasons they will be considered one stage at a time in succession starting with stage 00. The interrogate field applied to the complement storage elements by the current pulse on digit drive line 14–00–C will effect a momentary change in the read core of storage elements in the corresponding stage of registers 00 and 01 since they are in the "1" state so that a substantial signal will be induced on their respectively associated write-sense lines 16–01. Since both of the complementary storage elements of stage 00 of registers 02 and 03 are in the "0" state, no substantial signal will be induced in their respective write-sense lines 16–02 and 16–03. The interrogate field resulting from the current pulse on digit drive line 14–01–T inductively coupled to the true storage elements of stage 01 in the storage registers, will effect a further signal output on write-sense lines 16–01 with no additional signal being induced on write-sense line 16–00, 16–02 and 16–03. Continuing with the remaining stages of segment X of all of the registers, in a similar fashion it can be seen that the interrogate field resulting from the current pulse on digit drive line 14–02–T will result in signals being induced on write-sense lines 16–00 and 16–03; the interrogate field developed by the current pulse on digit drive line 14–03–T results in a signal output on sense line 16–00 only; and the interrogate field from the current pulse on line 14–04–C will not effect any signal output on any of the sense lines. From the foregoing it is seen that the bit storing stages of the storage registers which store binary values equal to the value contained in the corresponding bit order stage of the external register 24 will not produce an output signal on the sense line coupled thereto whereas those bit storing stages which store binary values not equal to the corresponding bit order value of the test word will produce sense line output signals. Further, it is seen that the non-storing stages or the ignore stages of the storage register will not produce sense line signals since both of the elements of the stage are in the same "0" state so as to be virtually unaffected by the digit drive line pulse regardless of the value of the corresponding bit order in the external register.

Also from the foregoing it is seen that in comparing the contents of segment X of the external register to the interval-defining numbers stored in the corresponding segment of the storage registers 00–03, output signals are developed on all of the sense lines except 16–02. The absense of a sense line signal indicates that the test word lies within the interval defined by the word contained in the associated storage register. This is verified by recalling that the test word in this example is equal to 35 and that segment X of register 02 stores the number representing the decimal interval of 32–39 whereas the remaining registers store words defining decimal intervals which do not encompass the test word. It is within contemplation of this invention, however, that the test word can be within the interval defined by more than one of the stored words which will result in signal indications on the corresponding sense lines.

As earlier stated, pairs of interval defining words can be combined to define extended limits. As interval defined by a single binary word is restricted so that the center of the interval is a power of two and the total number of increments will be a power of two. In order to achieve a more general representation of the interval, two adjacent interval defining numbers, each with a different size interval defined by the ignore bits are used. For example, the word stored in register 00 segment X having the lowest order bit in stage 05 as an ignore bit, can only define an interval having two increments which in the example are 14 and 15. The word stored in segment X of register 01 having the four lowest order stages in the ignore state, defines an interval having 16 increments ranging from 16 to 31 in the example. Depending on the bit capacity of the registers (or segments) the number increments can vary from a low of two to any multiple of a power of two. By combining pairs of interval defining numbers, a greater variation in the number of the intervals is possible. For example, the word pair 66 defines limits having 18 increments ranging from 14 through 31 with an interval center of 23.

Figure 4:
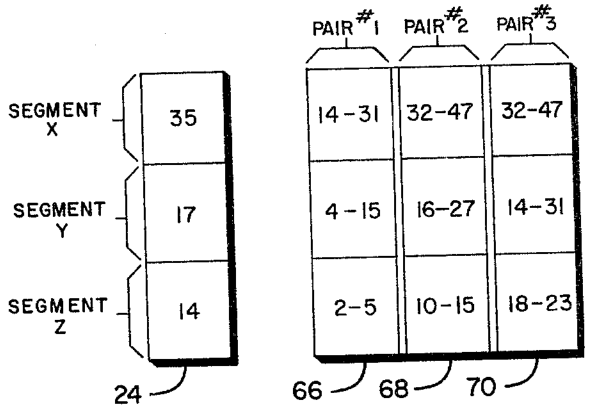
FIG. 4 is an aid in describing an illustrative operation of the invention.

The functional diagram of FIG. 4 in conjunction with the detailed apparatus of FIG. 1 will aid in understanding the operation of the instant invention for purposes of segmental searching or comparing. In FIG. 4 the external register 24 contains in the respective segments X, Y and Z the binary equivalents of the decimal numbers 35, 17 and 14. Pair No. 1 and pair No. 2 correspond to the register pairs 66 and 68 in FIG. 1 and so are similarly labeled. To further expand the explanation, a third register pair is indicated in FIG. 4 although only two register pairs are shown in FIG. 1. The decimal limits stored in the respective segments of the register pairs are shown in FIG. 4. Although each of the segments of the word in the external register and the words in the storage registers define segment limits, it should be recognized that the entire word in each of the registers, comprising the three segments, do refer to one particular item. It can be considered, for example, that each of the segments represent a different descriptive criterion relating to a single item. This will be more clearly pointed out later in the brief description of the instant invention as utilized in a specific operation such as radar tracking. Although in the figure there are shown three segments, obviously this is intended to be solely illustrative and any number of segments are possible.

From control means not shown, a signal is applied to the circuit of FIG. 1 to initiate the comparison of the contents of segment X of the external register 24 to the corresponding segment of the storage registers. This control signal may be applied in a variety of fashions, for example, as gate enabling signals for those gates associated with the segment X stages in the Gate And Bit Drivers section 18 via cable 20. The comparison is done in the manner described above, and since decimal 35 is within the range defined by the contents of segment X of register pairs 68 and 70, no signal output from their respective AND circuits (such as 48) results so their respective toroidal cores (such as 60) remain in the previously set state. Since the contents of segment X of the external register 24 is outside of the range defined by segment X of word pair 66, toroidal core 58 is cleared. Subsequent to the segment X compare, a next set of control signals is applied to enable the comparison of the contents of segment Y of the external register to the corresponding segment of the storage registers. Since segment Y of the external register contains 17 which lies within the range defined by the corresponding segment of register pairs 68 and 70, again their respective toroidal cores will not be altered. Toroidal core 58 corresponding to register pair 66, having been previously cleared, will not be affected since the segment X compare has previously indicated lack of correspondence between the word in the external register and the limit-defining word in register pair 66. Following the segment Y comparison, the control signals enable comparison of the segment Z portion of the external word, which is equal to 14. This value being in the range defined by segment Z of register pair 68 will again result in no change in state of the toroidal core 60, however, since this value is outside the limits defined by segment Z of register pair 70, the toroidal core associated with the latter register pair will be cleared. After all three segments have been sequentially compared, the toroidal cores are read-out by means not shown and those cores which are in the "0" or clear state will produce no signal output on their respective output windings while those that had remained in the set or "1" state will produce a signal output. In the example, an output signal will be developed on output winding 64 of core 60 indicating that the contents of each segment of the external register 24 lies within the limits defined by all of the corresponding segments in register pair 68. In this manner then it can bee seen that each of the various criteria can be successively compared and a signal indication of a match of the entire word is obtainable. Although the segmental compare has been described as a sequential operation, it is within contemplation of the instant invention that all segments can be concurrently compared. This can be effected, for example, by each of the segments of the storage registers having separate sense amplifiers which in turn have outputs connected to respective AND circuits. The outputs of the AND circuits are OR'd at the input winding to the associated toroidal core. With three segments, each of the register pair would have three sets of sense lines, one set for each segment, and three sets of sense amplifiers with each pair of sense amplifiers providing inputs to a separate AND circuit. Three AND circuit outputs are then coupled to a three input OR circuit with the output of the latter coupled to the input winding of a corresponding toroidal core.

Figure 2:
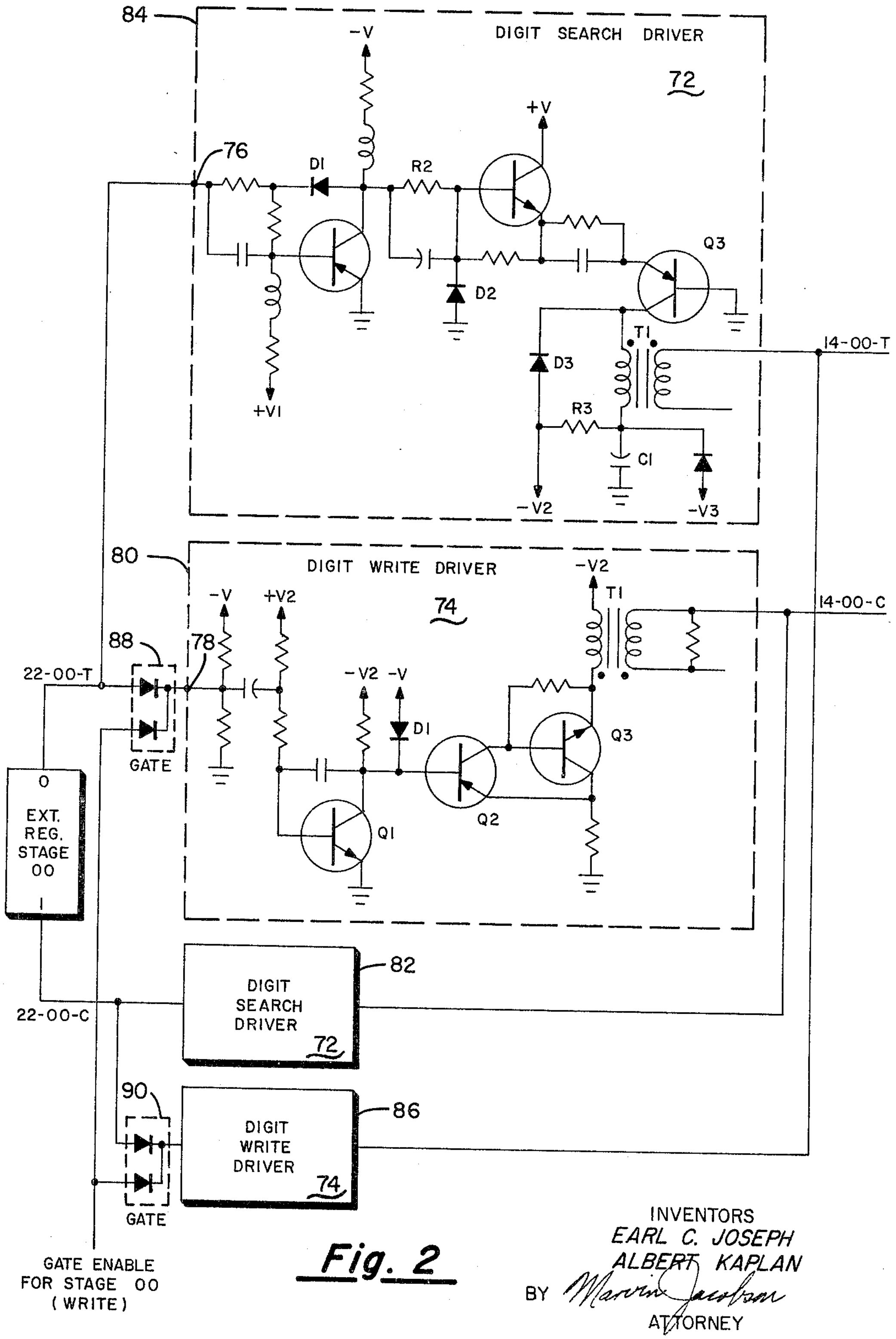
FIG. 2 shows illustrative circuitry utilizable in the digit drive line section of the figure embodiment.

Referring now to FIG. 2, there is shown for illustrative purposes circuitry utilizable in the Gate And Bit Drivers section 18 of the embodiment shown in FIG. 1. Only that portion corresponding to stage 00 of the external register 24 is shown in detail since each of the remaining stages would have corresponding circuitry. The external register stage 00 is represented by 72 and the 0 output terminal is connected by line 22–00–T and the 1 output terminal is connected to line 22–00–C in accordance with FIG. 1. There is a Digit Search Driver and a Digit Write Driver for each output terminal of the external register stage and these are respectively shown generally as 72 and 74. Since the circuitry for all of the digit search drivers as well as all of the digit write drivers is identical, the detailed electrical schematic of only one of each is shown. Although the particular circuitry in the drivers is not considered a part of this invention, a brief explanation of the operation of each follows. The Digit Search Driver 72 consists of three stages including a non-saturating, common-emitter amplifier section as the input stage, an emitter-follower section as the intermediate stage and the output stage being a common-base amplifier. Normally all three stages are in the off condition and a negative pulse signal applied to input terminal 76 turns all of the stages on. Diode D1 keeps the first stage out of saturation. The intermediate stage is a current amplifier which is normally biased to the off state by the combination of resistor R2 and diode D2. The third stage provides voltage amplification and the voltage signal appearing at the collector electrode of transistor Q3 is clamped to $-V2$ by the action of diode D3. The pulse is outputted to the digit drive line 14–00–T via a 1:1 transformer T1. Diode D4, having one electrode connected to $-V3$ and the other to the primary of transformer T1, provides a safety feature to prevent breakdown of transistor Q3 from any large negative voltage pulse that may result due to fly back of the transformer or coupling from the Digit Write Driver. Resistor R3 and capacitor C1 provide a further safety feature to limit the current through transistor Q3 is the pulse applied thereto were kept on for too long of a period of time.

The Digit Write Driver 74 consists of a saturated inverter stage which drives a Darlington current amplifier stage. Normally the input stage Q1 is in the on state in the saturated condition. A negative signal applied to the input terminal 78 turns off transistor Q1 and its collector voltage is clamped to $-V$ by diode D1. The negative signal on the collector coupled to the Darlington amplifier, which includes transistors Q2 and Q3, causes the current amplifier to turn on which provides a current pulse to the output transformer T1. The secondary of the current output transformer is connected to the digit drive line 14–00–C. Digit Write Driver 80 which is coupled to the "0" output terminal of external register stage 72 has its output connected to digit drive line 14–00–C to provide the current to the digit drive line of the proper magnitude and polarity to effect the previously described writing or storing operation. Digit Search Driver 82 which is coupled to the "1" output terminal of the external register stage 72 also has its output connected to digit drive line 14–00–C to provide the current pulse to said digit drive line of a proper polarity and magnitude to effect the search or compare operation previously described. In a similar manner digit drive line 14–00–T receives current pulses from its associated Digit Search Driver 84 and Digit Write Driver 86. Obviously then, during the search or compare operation only one of the Digit Search Drivers is activated for a given external register stage and during the writing or storing operation only one of the Digit Write Drivers for a given stage is activated.

Coupled to the input of the Digit Write Drivers 80 and 86 are the respective two input diode AND gate circuits 88 and 90. One of the inputs to each of the gates is a gate enable signal for stage 00 which would be inputted via cable 20 during the write or store operation. Although both of the write drivers associated with the given stage are enabled by said gate enable signal, only one will be activated depending on the binary value stored in that stage of the external register. For example, if stage 00 of the external register is in the "1" state, the signal output on line 22–00–C in combination with the gate enable signal to gate 90 will satisfy the input requirements so that an activating signal is applied to Digit Write Driver 86 to provide a current pulse on digit drive line 14–00–T. If the external register stage 00, is in the "0" binary state, stage 88 will provide an activating signal to Write Driver 80 to result in a current pulse on digit drive line 14–00–C. Where it is desired that a storage register stage should contain an ignore bit, that is, both of the storage elements in this stage remaining in the binary "0" state, no gate enable signal for that particular stage is provided during the write operation and, therefore, neither the complement nor the true storage element will be subjected to magnetic fields developed by their respectively corresponding digit drive lines. Although not shown, it should be recognized that, in general, control signals are also applied to the circuits of FIG. 2 to insure the proper sequence of operation so that the Search Driver is not activated during a write operation and additionally to control the sequence of operation where a segmental search is performed sequentially.

Figure 3:
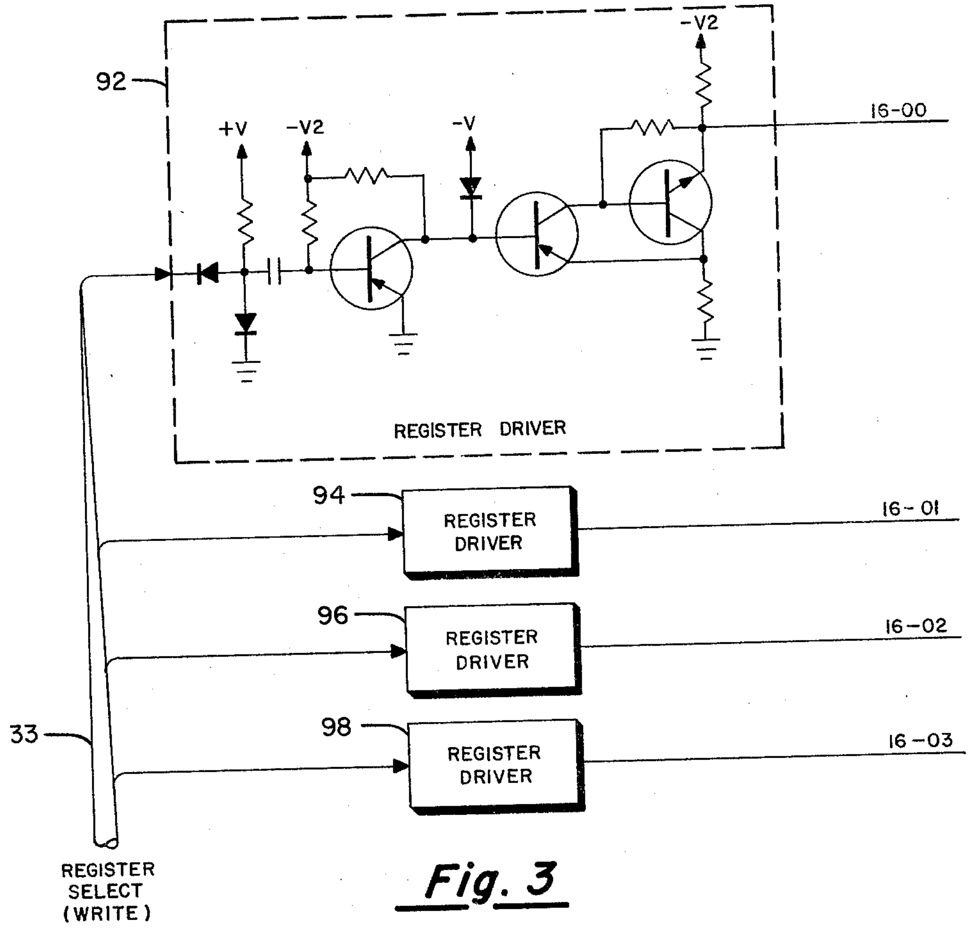
FIG. 3 shows illustrative circuitry for use as register drivers.

The arrangement of the four register drivers for each of the storage registers in the embodiment of FIG. 1 is shown in FIG. 3. An illustrative electrical schematic of the Register Driver is also included in FIG. 3 and it is similar to the Digit Write Drivers of FIG. 2. Each of the Register Drivers, 92, 94, 96 and 98 has an input via cable 33 which serves to selectively activate one of the Register Drivers. The outputs of the respective Register Drivers are connected to write-sense lines 16–00 through 16–03 to provide the required magnetic field to the storage elements during the write operation. In general, since the write-sense lines are each connected in common to a Register Driver output and a sense amplifier input, means are provided to isolate one from the other. During the writing operation the sense amplifier presents substantially no loading to the Register Driver and is not subject to any harmful effects from the application of a write current pulse and during the compare or search operation the Register Driver is likewise isolated.

A typical use of the instant invention is in a system of radar tracking of aircraft or missiles in combination with digital computer control. When used for traffic control of aircraft, in general, successive radar returns which include information relative to range, azimuth and elevation of a particular aircraft or target in relation to the radar station or other predetermined point, are utilized to track the target and to predict subsequent locations of the target. For various obvious reasons, such as tolerance accumulation and radar accuracy, the predictions can only be within limits. For track correlation, the predictions, in binary code, are stored in the search memory in the form of segmentized limit-defining pairs of words in a manner previously described in detail with the segments respectively relating to range, azimuth and elevation. By segmentizing into three dimensions with each of the dimensions defined by limits, by the inclusion of ignore bits, each stored prediction defines a volume. As subsequent radar returns are received from each of the plurality of targets indicating the latest actual position, the radar signals are digitized by an analog-to-digital converting means and constitute a test word for searching the memory. Resulting from the search is a signal indication that the actual new position (within limits) of the target is within the predicted position range. This signal indication is then utilized to make a new, more accurate prediction and the previously stored prediction is then up-dated. Additionally, the signal indication can be utilized for other purposes, for example, for determining if any of the aircraft are on collison paths. By associating the location in the search memory of each of the stored predictions to a predetermined location or address of the computer control memory section, the signal indication activates the computer to effect the updating or the collision prediction or other desired operations. The comparsion of the external test word concurrently to all stored words without destroying the stored information results in a great amount of time-saving so essential in tracking present day aircraft and missiles.

The instant invention is also readily adaptable for use in character recognition. Each of the stored words with ignore bits in predetermined bit order positions represents a different character such as a letter or a number. The digitized representation of a sensed character is placed in binary form in the external register to comprise the test word. The search operation is performed in the manner described and a signal indication of a match between the test word and any of the stored words on the sense line coupled to the particular stored word then indicates which of the unknown characters the test word represents. This signal indication can then be utilized to energize a utilization device such as a mechanical printer to print out the particular character.

Although the foregoing description has been limited to the use of ignore bits wherein no output signal will be developed when a test word bit is compared to the corresponding stored bit regardless of the value of the test word bit, the present invention contemplates the use of exclude bits. In the foregoing description, for illustrative purposes, the ignore bits were described as being in those stages in which both storage elements are in the "0" binary state so that application of an interrogate field via their respectively associated digit drive lines will not result in any substantial signal being induced on the associated sense line. A given stage of a storage register can be set to exclude bit value by setting both of the storage elements in the state of the "1" binary state so that regardless of the value in the corresponding bit order position of the external register, the application of an interrogate field to the exclude stage will result in a signal of a substantial nature being induced in the associated sense line. In this way then, certain of the stored words will never show a match when compared to an external test word. For certain applications where it is desired that certain ones of the stored words should not be considered during a compare or search operation, the use of the exclude bits are effective.

A more detailed description of a radar surveillance or tracking system utilizing the teachings of the instant invention now follows. In a typical surveillance system, a radar scans a volume of space and detects the positions of a number of targets. This position information is sent to a digital computer that establishes tracks on these targets. A track, as used here, means a body of information about the target: its range, azimuth, elevation, velocity and past history. A part of this body of information is a prediction of the target's position when it will next be seen by the radar and a measure of the accuracy of this prediction based upon radar errors, prediction errors, target maneuvers, and noise. When new sets of radar returns are received by the computer, they, in themselves, are useless. A given radar return achieves significance only when it has been designated as belonging to a specific track.

The function of target track correlation is the association of the set of radar returns with a set of existing tracks. The association begins when a radar return is compared with the predicted positions in the track storage. This function is performed by determining if a given radar return lies within a volume of space around a predicted target position. The volume is defined by the inaccuracies of the prediction previously mentioned. In general, each track will have a different error volume. In conventional digital computing systems, the target track correlation process is performed by a stored program. The program sequentially compares each radar return with the upper and lower limits of each dimension in the error volume for each target, one parameter at a time. That is, for the six dimensional parameters of a predicted target position, up to six comparisons are required for each report and this series of comparisons must be repeated for every track in storage. This means that the execution time for the conventional computing process increases with the square of the number of tracks. In a digital computing system incorporating a search memory, however, it is possible to compare each radar return with all tracks, in all dimensions, at once. So the track correlation time increases linearly with the number of reports. A typical figure of merit is that for a 1000 track case the task of target-track correlation is speeded up by a factor of 400 resulting in a sizeable reduction in the amount of computing equipment required for this task.

The target track correlation process involves matching a radar return with a set of predicted target positions to associate each return with the track to which it belongs. This association is performed normally on the basis of nearness to the predicted position: a radar return will be associated with the predicted position to which it is the closest. A threshold is included in the process to prevent a return from being associated with the closest track unless the deviation from the track is within specified limits. This deviation from the track or error volume is computed by using the past history on a track to predict where the track will be seen on the next sweep of the radar. This prediction will be approximately in the center of the error volume. Using the precision of the radar at different ranges and elevations, the number of radar sweeps the target has been tracked, and possible target maneuvers, the error volume can be computed as illustrated in FIG. 5. When only a few reports exist on a track, the gates defining the error volume are of necessity large. On the next sweep of the radar any report falling within this large volume of space is correlated with the track in question. If more than one report is correlated, a track confusion exists and further resolution by other programs will be required. When many reports have been correlated on a track over a relatively large number of sweeps, the error volume becomes smaller and smaller until the limit of the radar's precision and the target's maneuvering capability is reached. Using the predicted position of the track, the gate intervals of the volume are established by subtracting and adding approximately one-half the error in each dimension.

Two locations in memory are used for storing the intervals for each position. Logic in the memory associates each pair of words or intervals during the between limits search. When these two words are written into the search memory, both the prediction and its own gates are stored. In general, each track has a different gate size associated with it. During the search operation the search memory operates in the manner previously described relative to within-limits operation.

The essential correlation process when using a search memory is the determination of all subscript $i$'s—the track or tracks that the radar return correlates—which satisfy the threshold equation shown in FIG. 6. In the equation, $X_p$ is the lower limit of one dimension of the predicted position parameter while $X_{ph}$ is the upper limit. This predicted position interval of one component is determined from the past history of the track using a set of smoothing and predicting equations. The difference between $X_p$ and $X_{ph}$ corresponds to the uncertainty or errors in the prediction previously mentioned. The measured position component, $X_m$, is provided by the radar return.

In the search memory, since it is desirable to have a different gate for each track in storage, the gates must be stored with the predictions. The elements representing the bits in the search memory can be in one of three conditions. One condition represents a stored "1," a second condition represents a stored "0," and the third condition represents ignore. This third condition allows selected bits in the search memory to be ignored during the searching process as previously described. This condition is represented by the symbol $b$. To further illustrate, consider the following example: Assume that the predicted range value is 214 miles (011010110 in binary), and the uncertainty is 8 miles on each side of the prediction. Then the lower limit of the predicted interval, X, is 206 miles (011001110 in binary). The upper limit of the predicted interval, $X_{ph}$, is 222 (011011110 in binary). The lower interval using ignore bits is 206 to 207 miles and is represented by the binary number 01100111$b$. The upper interval is 208 to 223 miles and is represented by the binary number 01101$bbbb$. Thus, all values in the desired interval of 206 to 222 miles are included in the prediction stored in the search memory. There is, in addition, one extraneous match at 223 miles. This extraneous match can be eliminated easily by performing a simple programmed test using the non-transformed interval.

To this juncture only a single coordinate position has been considered. The track correlation process requires matches on all three coordinates of range, azimuth and elevation. Each coordinate limit is represented by two numbers, and a match with either of these numbers represents a correlation in that coordinate. In order to describe detection of a match in three coordinates, range, azimuth and elevation, the multi-dimension search match equation of FIG. 6 is used. In order to mechanize this equation in the search memory, two adjacent memory cells are used to define the volume, one contains the upper interval-defining number, the other contains the lower interval defining number. The sense windings coupling these two words are "AND"ed as previously described. The search is segmented into three parts. First the range segment is searched and if there is a match on either of the intervals, the associated toroidal core will not be altered. Then the azimuth and finally the elevation segments are searched in sequence. The result is that the state of the associated toroidal core represents the complement of the match equation of FIG. 6.

An illustrative apparatus for performing the track correlation process comprises six basic parts as shown in FIG. 7; a Search Register 100, a Mask Register 102, a Search Memory 104, a Translator 106, an Address Register 108, and a Control Unit 110 with the required interconnections. A computer 112 and a Radar Section 114 to indicate their relationship with the correlation apparatus. The Search Register holds the word (the measured report in the target track correlation process) used in the search operation for locating the address or code of the word that it matches in the Search Memory. It is also used while loading the Search Memory to hold the word to be written. The Mask Register is also a dual function register. One function is for holding a word that defines which bits in the Search Register are to be written directly into the Search Memory and which bits are to be written as ignore bits. The Mask Register is also used for a partial word search capability. Only those bit positions designated by "1's" in the Mask Register will be searched. The Search Memory non-destructively holds the words being searched. When a multiple match occurs, during a search operation, a single address is decoded by the translator and transferred to the Address Register. Multiple matches occur in the target track correlation process, for example, when track cross.

In order for the system to resolve the multiple match case the Translator notifies the Computer whether there was a single match, a multiple match or no match after a search operation. After receiving the signal that a multiple match has occurred the program performs the following sequence in order to locate the other tracks in the crossing track case. The word for which the first match was found is altered in the Search Memory. Then a second search is performed to find the other track. In reality the track is not found but rather an address which is used to locate the body of information about the track contained in a Computer program memory. The Address Register holds the associative address after a search until the Computer uses it. During a loading operation the Address Register holds the location where the word contained in the Search Register is to be written. The Control Unit provides for the usual gating, timing, and control functions required by the memory and its associated logic.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims:

1. Apparatus for comparing an external binary word to a plurality of other binary words, comprising: a plurality of memory storage registers each capable of storing preselected digits of numbers in digit order stages, every two memory registers constituting a register pair for storing numbers defining upper and lower numerical limits; each stage which stores said preselected digits comprising a pair of storage elements respectively storing signal representations of the true and complementary value of the stored digit; an external storage register for containing a test number, each digit order stage of said external register including means for developing a signal representation of the value of the digit stored therein; means for applying said developed signal representation of each external register stage to the corresponding digit order stages of said memory storage registers for effecting at least a momentary change in the stored signal representation in those stages which store said preselected digits when the stored digit order value is not equal to the corresponding test number digit order value; and means coupled to each register pair for sensing change in both registers of the respective pairs resulting from said applied signals.

2. Apparatus as in claim 1 wherein the applied signal effects only a temporary change in the unequal stored signal representation so that said stored signal representation is not destroyed.

3. In a search memory: a pair of memory storage registers for storing preselected bits of a pair of binary numbers which define upper and lower numerical limits, each stage in each of said registers comprising a pair of bistable magnetic elements, means for setting selected ones of said elements of said stages in opposite magnetic states in accordance with the true and complementary binary values of the bit, and means for storing other selected ones of said elements of said stages in a same predetermined magnetic state; and external register containing a test binary number comprising a plurality of digit order stages, each stage including means for developing a signal representation of the binary value of its contained bit; means for coupling said developed signal representation from each stage of said external register to the corresponding digit order stages of said memory storage registers for effecting a substantial momentary change in the magnetic state of one of the magnetic elements in only selected ones of said stages which are of a value not equal to the value of the corresponding test word bit while not effecting a change in the magnetic state of any of said other elements of said stages; and means coupled to each of said memory storage registers for sensing change in magnetic state of at least one magnetic element in each of the pair of memory registers, the absence of any change in magnetic state in either of said registers indicating that said test number is within the numerical limits defined by said stored pair of numbers, said means including means for at least temporarily indicating any said sensed change in magnetic state in either of said pair of registers.

4. For use in an apparatus for comparing a test number to pairs of numbers stored in a memory to determine if the test number is within the limits defined by each pair of stored numbers: a pair of memory storage registers for storing limit defining numbers, wherein each stage of said memory registers comprises a pair of magnetic elements each of which exhibit at least two stable states, including means for setting some of said stage element pairs in different magnetic states, and means for setting other of said stage elements respectively both in a same magnetic state; an external register for storing a test number; means for comparing digits of said test number concurrently to selected digits in corresponding digit order stages in said memory registers; sensing means coupled to said memory registers including signal means responsive to said comparing means for developing a first signal indication when the test number is outside the limits defined by said pair of stored numbers and a different signal indication when the test number is within said limits; and means coupled to said signal means for at least temporarily storing said signal indications from said pair of memory storage registers.

5. Apparatus as in claim 4 wherein said comparing means comprises: means connected to said external register adapted to receive signal representations of the value of the test word digits for effecting a momentary change in the state of at least one magnetic element in each of said memory registers when said test word is outside said limits.

6. For use in an apparatus for comparing a test number to pairs of numbers stored in a memory to determine if the test number is within the limits defined by each pair of stored numbers: a pair of memory storage registers for storing limit defining numbers, wherein each stage of said memory registers comprises a pair of magnetic bistable thin-film elements, including means for setting selected ones of said elements in selected ones of said stages in opposite magnetic states for respectively storing representations of the true and complementary value of a binary digit, and a means for setting both of said elements in other selected ones of said stages in a same magnetic state; an external register for storing a test number; means for comparing digits of said test number concurrently to selected digits in corresponding digit order stages in said memory registers; sensing means coupled to said memory registers including signal means responsive to said comparing means for developing a first signal indication when the test number is outside the limits defined by said pair of stored numbers and a different signal indication when the test number is within said limits; and means coupled to said signal means for at least temporarily storing said signal indications from said pair of memory storage registers.

7. Apparatus as in claim 5 wherein said sensing means comprises: first and second conductors inductively coupled to all elements in each of the respective memory registers for developing an output pulse signal in response to any momentary change in the magnetic state of any element in the corresponding register effected by said comparing means; and means coupled to said conducting means for producing a further signal indication in response to said output pulse signals appearing on both conductors.

8. For use in an apparatus for comparing a test number to pairs of numbers stored in a memory to determine if the test number is within the limits defined by each pair of stored numbers; a pair of multi-stage memory storage registers for storing upper and lower limit defining binary numbers, each stage of said registers comprising a pair of magnetic bistable elements, means for setting selected ones of said elements in some of said stages in opposite magnetic states, each state respectively capable of storing representations of the true and complementary value of the stored bit, and means for setting both of said elements in other of said stages in a same magnetic state; an external storage register for storing a binary test number, each stage of said external register including a 0 and a 1 output signal developing means for providing an output signal in accordance with the binary value of the bit stored therein; first conducting means connected to one of said signal developing means of each external register stage and inductively coupled to a first one of the magnetic elements in each corresponding digit order stage of said memory storage registers; second conducting means connected to the other of said signal developing means of each external register stage and inductively coupled to the other magnetic element in each corresponding digit order stage of said memory storage registers; said first and second conducting means being arranged with respect to the magnetic elements such that the output signal from the external register stage will effect a substantial momentary change in the magnetic state of only one of the elements in those same stages when the stored bit is of a value not equal to the corresponding test number bit value while not affecting the magnetic state of either element in said other stages; separate conducting means inductively coupled to all magnetic elements in each of the respective memory registers for developing a signal in response to change in the magnetic state of any of said elements effected by said external register output signals, the absence of said latter developed signal on either of said latter conducting means indicating that said test number is within the limits defined by said stored pair of numbers; and means coupled to pairs of said separate conducting means for detecting the absence of a developed signal on either of said pair of conducting means.

9. Apparatus as in claim 8 wherein; said first conducting means are connected to the 0 output terminals and are inductively coupled to the true-value ones of said elements in the corresponding digit order stages of said memory registers; and said second conducting means are connected to the 1 output terminals and are inductively coupled to the complementary-value ones of said elements in the corresponding digit order stages of said memory registers.

10. Apparatus as in claim 9 wherein the external register output signal is such as to effect a substantial momentary change only in those magnetic elements which are in a magnetic state equivalent to a binary "1."

11. Apparatus as in claim 9 wherein the elements in said other stages are both in a magnetic state equivalent to a binary "0."

12. Apparatus as in claim 8 wherein: said first conducting means are connected to the 1 output terminals and are inductively coupled to the true-value ones of said elements in the corresponding digit order stages of said memory registers; and said second conducting means are connected to the 0 output terminals and are inductively coupled to the complementary-value ones of said elements in the corresponding digit order stages of said memory registers.

13. Apparatus as in claim 12 wherein the external register output signal is such as to effect a substantial momentary change only in those magnetic elements which are in a magnetic state equivalent to a binary "0."

14. Apparatus as in claim 13 wherein the elements in said other stages are both in a magnetic state equivalent to a binary "1."

15. For use with a device for comparing a binary test word to at least one other binary word, wherein each bit value of the other word is represented by the state of a pair of bistable elements, in combination: means for selectively setting the elements of certain of said pairs of bistable elements to opposite stable states to represent a binary value; and means for selectively setting both elements of certain other pairs of said bistable elements to a same stable state.

16. The combination of claim 15 further including: comparing means coupled to each pair of bistable elements adapted to receive signal representations of the binary value of the corresponding order bit of a test word for effecting at least a substantial change in the state of one of the elements in said certain pairs of bistable elements only when the test word bit and the other word bit are of unequal values while not effecting any substantial change in state of either element in said certain other pairs of bistable elements regardless of the value of the corresponding test word bit.

17. The combination of claim 16 further including: sensing means coupled to all of said bistable elements for detecting any substantial change in state effected by said comparing means; and means responsive to said sensing means for indicating the absence of any substantial change.

18. The combination of claim 15 further including: comparing means coupled to each pair of bistable elements adapted to receive signal representations of the binary value of the corresponding order bit of a test word for effecting at least a momentary substantial change in the state of one of the elements in said certain pairs of bistable elements only when the test word bit and the other word bit are of unequal values while effecting substantial change in state of at least one of the elements in said certain other pairs of bistable elements regardless of the value of the corresponding test word bit.

19. The combination of claim 18 further including: sensing means coupled to all of said bistable elements for detecting any substantial change in state effected by said comparing means; and means responsive to said sensing means for indicating the detection of a substantial change.

20. For use with a device for comparing a binary test word to a plurality of memory binary words wherein the value of each bit of the memory words are represented by the state of a pair of bistable storage elements, in combination:

(A) means for selectively setting each element of certain pairs of bistable memory-word storage elements to opposite stable states to respectively represent storage of a true and complementary binary value;

(B) means for selectively setting both elements of other pairs of bistable memory-word storage elements to a same first stable state;

(C) means for selectively setting both elements of still other pairs of bistable memory-word storage elements to a same second stable state;

(D) comparing means coupled to each of said pairs of bistable memory-word storage elements adapted to receive signal representations of the binary value of a corresponding order bit of a test word including, (1) means for effecting only a momentary substantial change in the state of one of the opposite-state elements of said certain pairs of storage elements when the test word bit and the corresponding memory word bit are of unequal value, (2) means for effecting no substantial change in the state of those pairs of storage elements which are both in said first stable state regardless of the value of the corresponding test word bit, (3) and means for effecting only a momentary substantial change in the state of at least one element of those pairs of storage elements in both elements are in said second stable state regardless of the value of the corresponding test word bit;

(E) sensing means coupled to all of said bistable elements for detecting any substantial change in state effected by said comparing means;

(F) and means responsive to said sensing means for indicating the absence of any substantial change in any elements comprising a word-storing group.

21. The combination of claim 20 wherein:

(G) each of said bistable elements comprises a nondestructive-read-out magnetic element;

(H) and the means of A, B and C comprise: conducting means adapted to receive gated signal pulses, inductively arranged with respect to said magnetic elements to provide magnetic fields of direction and magnitude sufficient to set the elements to the respective states.

22. The combination of claim 21 wherein the means of D1, 2 and 3 comprise: conducting means inductively arranged with respect to said magnetic elements to provide magnetic fields thereto in accordance with the binary value of the corresponding order bit of the test word said magnetic fields being of directions and magnitudes to effect only a momentary substantial change in state of some of said elements and to effect no substantial change in state of other of said elements as required.

23. For use in a digital computing apparatus of the internally stored program type, in combination: an addressable program memory section storing program instructions and operands; a search memory section for storing limit defining numbers in pairs of registers, each of said pair of registers being associated with a different address location in said program memory section and each of said registers comprised of a plurality of ordered stages, each of said stages including a pair of bistable ferromagnetic thin-film storage elements; means for setting predetermined ones of said elements to a remanent state indicative of a true digit value and the associated ones of said elements to a remanent state indicative of a complement digit value; means for setting both of said elements in other predetermined ones of said pairs to a same remanent state; a temporary storage register for storing a test number; means for selectively comparing digits of said test number concurrently to digits in respectively corresponding digit order stages in said search memory registers; sensing means respectively coupled to each of said pairs of search memory registers for detecting the results of said compare in all of said register pairs simultaneously; means responsive to said sensing means including means for developing an output signal only when at least one compared digit in both registers of the corresponding pair is not of a value equal to the test word digit, the absence of an output signal thereby indicating that the test number is within the limits defined by the numbers stored in the corresponding pair of search memory registers; and means responsive to said within-limits signal indication for enabling the associated address location in said program memory section.

References Cited by the Examiner

UNITED STATES PATENTS

| | | | |
|---|---|---|---|
| 3,017,610 | 1/1962 | Auerbach et al. ---- | 340—172.5 |
| 3,031,650 | 4/1962 | Koerner ---------- | 340—172.5 |
| 3,049,692 | 8/1962 | Hunt ----------- | 340—146.1 |
| 3,058,104 | 10/1962 | Garfinkel et al. --- | 340—146.1 X |

MALCOLM A. MORRISON, *Primary Examiner.*

ROBERT C. BAILEY, *Examiner.*

E. M. RONEY, M. P. ALLEN, *Assistant Examiners.*